(12) United States Patent
Mikami

(10) Patent No.: US 7,151,612 B2
(45) Date of Patent: Dec. 19, 2006

(54) RECORDING APPARATUS AND METHOD OF CORRECTING NONUNIFORMITIES IN DENSITY OF RECORDING HEAD

(75) Inventor: Fumio Mikami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 09/838,279

(22) Filed: Apr. 20, 2001

(65) Prior Publication Data

US 2001/0035889 A1 Nov. 1, 2001

(30) Foreign Application Priority Data

Apr. 28, 2000 (JP) .............................. 2000-129989

(51) Int. Cl.
*G03G 15/00* (2006.01)
(52) U.S. Cl. .......................... 358/1.14; 399/15; 399/72
(58) Field of Classification Search ............... 358/1.14, 358/1.9, 1.15; 382/274; 347/15; 399/15, 399/72
See application file for complete search history.

(56) References Cited

U.S. PATENT DOCUMENTS 5,528,270 A 6/1996 Tajika et al. .................. 347/19
6,160,922 A * 12/2000 Hayashi ....................... 382/274
6,439,683 B1 * 8/2002 Matsumoto et al. .......... 347/15
6,697,167 B1 * 2/2004 Takahashi ................... 358/1.9

FOREIGN PATENT DOCUMENTS

JP 5-69545 A 3/1993

* cited by examiner

*Primary Examiner*—Kimberly Williams
*Assistant Examiner*—Peter K. Huntsinger
(74) *Attorney, Agent, or Firm*—Fitzpatrick, Cella, Harper & Scinto

(57) ABSTRACT

The invention solves a problem of nonuniformities in density produced corresponding to a particular density level, especially due to density characteristics differing according to the density level, in a technique for correcting the nonuniformities in density of an image recorded by a recording head having plural recording elements arranged therein. Nonuniformities in density differently produced according to the density level can be effectively corrected by the steps of preparing a correction table group with correction differing according to the density level; correcting nonuniformities in density according to a test pattern with a predetermined density in advance; further recording test patterns corresponding to plural densities; and enabling the correction table group to be determined corresponding to the production of the nonuniformities according to the density level.

34 Claims, 11 Drawing Sheets

No. 0

No. 16

No. 31

No. 0

No. 16

No. 31

No. 0

No. 16

No. 31

RECORDING APPARATUS AND METHOD OF CORRECTING NONUNIFORMITIES IN DENSITY OF RECORDING HEAD

BACKGROUND OF THE INVENTION

1. Field of the Invention

The present invention relates to a recording apparatus capable of correcting an uneven image density produced due to variations in recording characteristics of a recording head having plural recording elements arranged therein and a correcting method of the nonuniformities in density. In particular, it relates to a technique of correcting the nonuniformities in density of a recording head in a record forming apparatus for forming an image by the recording head performing binary recording.

2. Description of the Related Art

Hitherto, image forming apparatuses for forming an image on a recording medium (hereinafter referred to as a recording medium, a recording sheet, or simply a sheet) have been proposed, which apparatuses have a recording head attached thereon and employ various recording systems therein. As the recording systems of the recording head, there are a wire dot system, a heat-sensitive system, a thermal transfer system, an ink-jet system, and so forth. In particular, the ink-jet system directly ejecting ink onto a recording sheet is inexpensive in running cost and is noted as a silent recording method.

In these various recording systems, gradation recording by recording elements arranged in the recording head is limited due to various reasons, so that an apparatus employing a binary recording system is also utilized. In particular, in the ink jet system, complicated control is required for controlling the size of an ejected ink drop and for modulating the size of an ink drop over a wide range, so that apparatuses employing the binary recording system which can be relatively easily controlled are widely used. As another image forming apparatus employing such a binary recording system (hereinafter referred to as a binary printer), there is known an electrophotographic printer using a recording head (referred to as an LED head) having LEDs (light emitted diodes) which are light emitting elements arranged therein. Also, it has been conventionally known that in the binary printer mentioned above, multi-level image data (hereinafter also referred to as an image signal) representing the gradation corresponding to density is converted into binary data by binarizing means so as to achieve gradation recording with area gradation by controlling recording through the binary data.

Hitherto, it has also been known that in such a binary printer, nonuniformities in density are produced in the recorded image due to variations in characteristics of an individual recording element of the plural elements arranged in the recording head.

In the ink-jet printer, for example, it is conventional that a recording head having plural nozzles arranged therein is used; ejecting means arranged in the recording head corresponding to each nozzle are driven; and ink drop ejection is controlled so as to perform binary recording. In such a structure, when variations in the amount of ink ejection from each nozzle in the recording head are produced, nonuniformities in density may be generated in recorded images. The reasons for the variations in the amount of ink ejection from each nozzle seem to be variations in shape and size of each nozzle of the recording head and changes in ink ejecting power by the ejecting means, among others. These reasons may frequently result from variations in the manufacturing process, so that the problem is difficult to be fundamentally resolved.

A bubble jet system is known among various ink-jet systems, in which a heater functioning as an electrothermal converter is adopted for generating thermal energy as ejecting means corresponding to an electric signal; bubbles are produced in ink by the thermal energy generated by the heater; and the ink is ejected by the pressure of the bubbles. In the bubble jet system, very small variations in thickness and area of the heater are produced in the manufacturing process, resulting in differences in the resistance value of each heater, so that variations in size of the ejected ink drop are generated and result in nonuniformities in density of the recording image.

As a correction technique for correcting such nonuniformities in density, a method called head shading is known. The head shading is a technique in which multi-level image data representing density corresponding to each nozzle are corrected. That is, the magnitude of the density represented by the image data is changed corresponding to dispersion in density of each nozzle so as to correct the nonuniformities in density, and thereby obtain an image having uniform density.

Also, in the printer using the LED head mentioned above, emitting dispersion of each LED arranged in the head may result in nonuniformities in density produced in the recorded image and the nonuniformities in density can be corrected by the head shading technique described above.

The head shading comprises the steps of: first, recording a pattern with a predetermined density using the recording head; then, reading the density of the recorded pattern; and correcting the density represented by the image data corresponding to each recording element based on the recorded density corresponding to each recording element.

In the conventional technique of the head shading, a correction table corresponding to each recording element is selected based on the result of the recorded pattern with a predetermined density. For example, in recording multi-level image data representing a density of 256 levels of gradation from 00H to FFH, if a recording element has recorded a pattern based on a density corresponding to the gradation value 80H, but is determined to have a density higher than the targeted ideal density, a table decreasing the density of the input image signal is set for that recording element. If a recording element is determined to record at a density lower than the ideal density, a table increasing the density of the input image signal is set for that recording element.

The procedure for table conversion will be described with reference to FIG. 10.

In FIG. 10, the abscissa indicates the density of the input image signal and the ordinate indicates the density of the image signal after conversion. A straight line A in FIG. 10 is a line having a gradient of 1, and in the conversion according to that line, the input image signal is output as it is with the same density without conversion of the density. A straight line B shows a table decreasing the output density of the input image signal and a straight line C shows a table increasing the output density of the input image signal.

Therefore, to the recording element recording at a density determined to be higher than the targeted density, such a table as indicated by the straight line B in FIG. 10 is applied, while to the recording element recording at a density determined to be lower than the targeted density, such a table as indicated by the straight line C in FIG. 10 is applied. In addition, the tables are not limited to the straight lines A, B, and C; it is possible to respond to nonuniformities in density of each recording element by preparing plural tables having lines with gradients different from those shown in FIG. 10. For example, 32 tables can be prepared as the conversion tables for the head shading, so that the nonuniformities in density can be satisfactorily corrected by applying any one of the 32 tables even when the range width of the nonuniformities in density for each recording element is large.

However, in the conversion table system shown in FIG. 10, with respect to density levels from 00H to FFH of the input image signal, the density is uniformly converted. That is, the conversion table of each recording element is set based on the result of the recorded pattern with a predetermined density level (the pattern of the density value 80H, for example). Consequently, a table uniformly increasing or uniformly decreasing the densities is applied to the input values from 00H to FFH of density. Therefore, a table performing correction over the entire density level range is set based on the result of the recorded pattern with a predetermined density level.

According to the conventional technique described above, for a recording element that records with density decreasing over the entire density level range or a recording element that records with density increasing over the entire density level range, i.e., for recording elements having the same density characteristics, nonuniformities in density can be efficiently corrected.

However, with respect to a recording element with density characteristics having a different correction effect (also referred to as correction sensitivity) depending on the density level, there has been a problem that normal correction cannot be performed at a specific density level. That is, when there is a recording element that records with density decreasing especially at a low density level, although correction is normally performed at the high density level, at the low density level, the density decreases even if correction is performed at the low density level, so that nonuniformities in density cannot be resolved because of density characteristics difference between the higher and lower density levels. In such a manner, when there is a recording element with density characteristics which differ according to the density level among recording elements of a recording head, nonuniformities in density also differ at a specific density level, so that there has been a problem that the density correction is not satisfactorily performed by the above-described technique.

SUMMARY OF THE INVENTION

In view of the above-described problem, the present invention has been proposed. According to one aspect, the present invention relates to a recording apparatus for recording an image on a recording medium by using a recording head in which a plurality of recording elements are arranged, with the apparatus including memory means, first forming means, first setting means, second forming means, and second setting means. The memory means stores a first table group for correcting input multi-level image data, the first table group comprising a plurality of first correction tables, each first correction table having a different degree of correction, and a second table group comprising a plurality of second correction tables having correction characteristics which are different from correction characteristics of the first table group with respect to different density levels. The first forming means forms a first test pattern by the plurality of recording elements at a predetermined density. The first setting means sets test correction tables for making the densities of an image to be recorded by the plurality of recording elements uniform by associating first correction tables of the first table group with respective recording elements of the plurality of recording elements based on a result of reading the densities of areas of the first test pattern that correspond to the plurality of recording elements. The second forming means forms a second test pattern having a plurality of different density levels, the second test pattern being recorded with the recording elements being corrected by the test correction tables set by the first setting means. The second setting means sets recording correction tables corresponding to each of the plurality of recording elements based on the second test pattern, the recording correction tables being determined from among the first table group and the second table group.

According to another aspect, the present invention relates to a method for correcting nonuniformities in the density of an image recorded by a recording head having a plurality of recording elements arranged therein. The method includes the steps of forming a first test pattern by the plurality of recording elements at a predetermined density and setting, in a first setting step, test correction tables for making the densities of an image to be recorded by the plurality of recording elements uniform by associating first correction tables, which are from among a first table group for correcting input multi-level image data, with respective recording elements of the plurality of recording elements based on a result of reading densities of areas of the first test pattern that correspond to the plurality of recording elements. The method further includes the steps of forming a second test pattern having a plurality of different density levels, the second test pattern being recorded with the recording elements being corrected by the test correction tables set in the first setting step, and setting, in a second setting step, recording correction tables corresponding to each of the plurality of recording elements based on the second test pattern, the recording correction tables being determined from among the first table group and a second table group comprising second correction tables having correction characteristics which are different from correction characteristics of corresponding first correction tables of the first table group with respect to different density levels.

According to still another aspect, the present invention relates to a recording apparatus for performing binary recording on a recording medium by controlling binarizing means for binarizing input multi-level data and driving recording heads, each comprising a plurality of recording elements, according to a binary signal output by the binarizing means. The apparatus includes a plurality of density correcting table groups, selecting means, and correcting means. The plurality of density correcting table groups correct input multi-level image data, the density correcting table groups each comprising a plurality of correcting tables, each having a different correction amount and having different correction characteristics from each other. The selecting means selects one density correcting table group from the plurality of density correcting table groups. The correcting means corrects multi-level data by associating the multi-level data correspond with a correcting table with a correcting table from the selected correcting table group according to a pixel address of a corresponding recording head for each pixel.

According to the present invention, nonuniformities in density differently produced according to the density level can be sufficiently corrected by preparing a correction table group with correction differing according to the density level, correcting nonuniformities in density according to a test pattern with a predetermined density in advance, recording test patterns corresponding to plural densities, and selecting the correction table group used for correction corresponding to the production of the nonuniformities according to the density level.

Further objects, features and advantages of the present invention will become apparent from the following description of the preferred embodiments with reference to the attached drawings.

DESCRIPTION OF THE PREFERRED EMBODIMENTS

Figure 1:
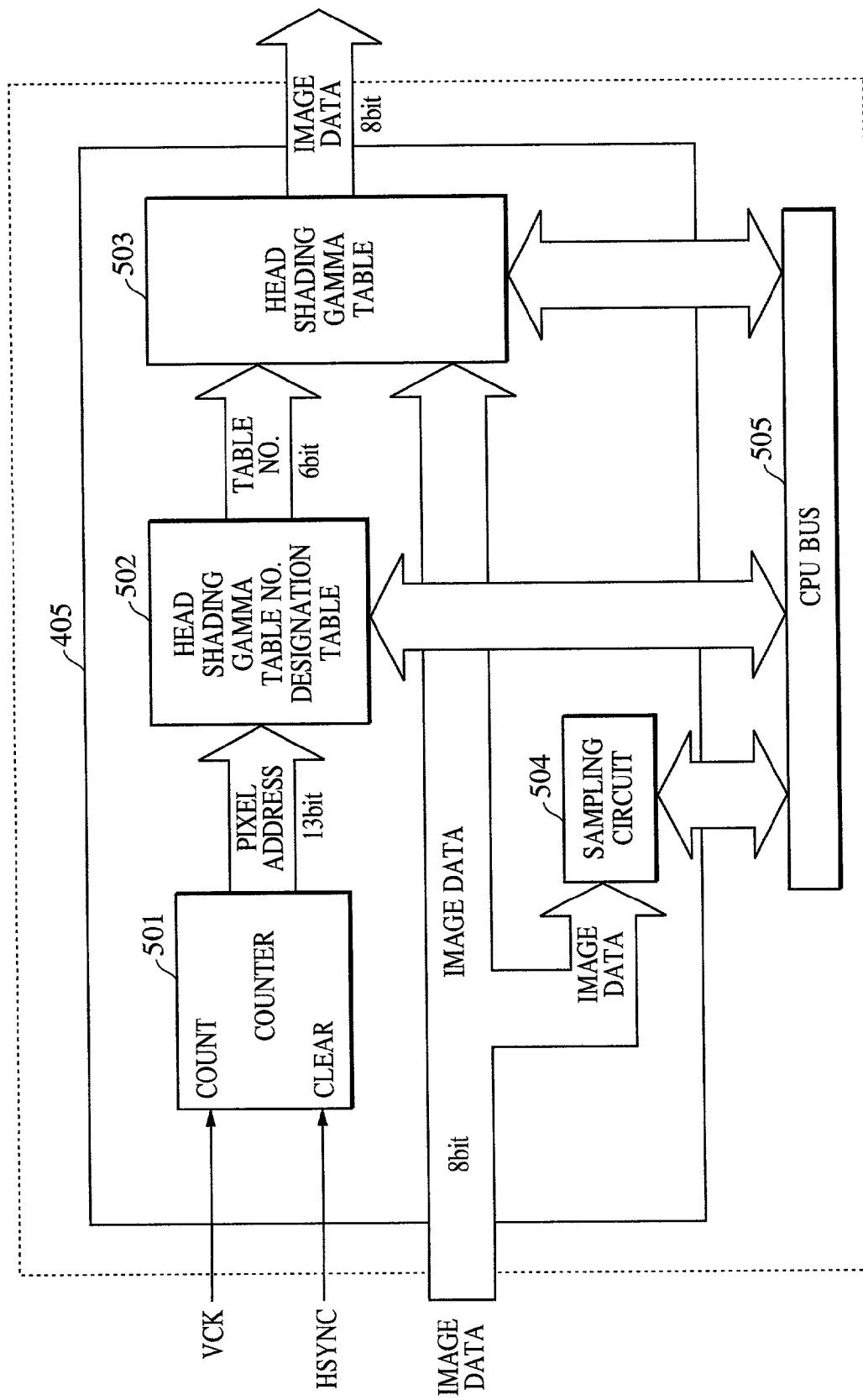
FIG. 1 is a block diagram of a circuit for correcting nonuniformities in density according to an embodiment of the present invention.

Referring to the drawings, an embodiment of the present invention will be described below.

In the embodiment which will be described below, an electrophotographic recording apparatus for recording with a recording head having recording elements such as LEDs (light emitted diodes) arranged therein will be described as an example. In addition, the apparatus described in the embodiment is a copying machine capable of copying a document image and has a reading section for reading a document image.

(1. Apparatus Structure)

Figure 11:
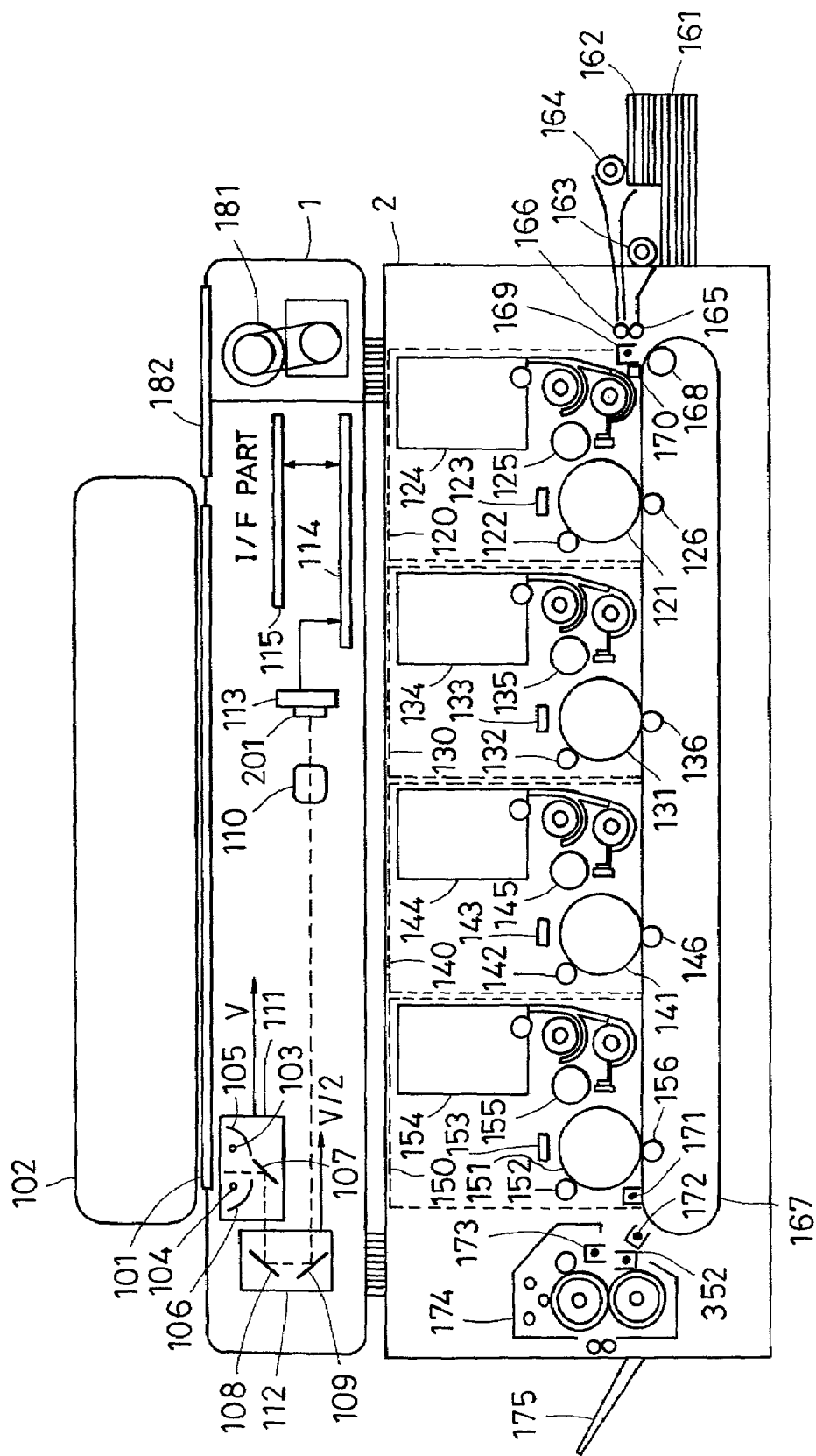
FIG. 11 is a sectional view of a recording apparatus according to the embodiment of the present invention.

FIG. 11 is a schematic sectional view of a structure of a copying apparatus according to an embodiment of the present invention. This apparatus is roughly divided into a reading unit 1 and a printer unit 2.

First, the reading unit 1 (hereinafter also referred to as a reader unit) will be described. FIG. 11 shows a document-placing table 101 formed from glass on which a document is placed, an automatic document feeder 102, light sources 103 and 104 such as halogen lamps or fluorescent lamps for illuminating a document, reflecting parabolic mirrors 105 and 106 for converging a light beam from the light source 103 or 104, mirrors 107, 108, and 109 for reflecting a reflected light beam from a document, a lens group 110, and a CCD 201 which will be described later. The light sources 103 and 104 and the reflecting parabolic mirrors 105 and 106 are accommodated in a carriage 111 and the mirrors 108 and 109 are accommodated in a carriage 112. In addition, instead of the automatic document feeder, a specular pressure plate or a white pressure plate (both not shown) may be arranged.

The carriages 111 and 112 are mechanically moved by the rotation of a carriage driving motor 181 at respective speeds of v and v/2 in a direction shown by the arrows. The carriage moving direction is orthogonal to an electrical scanning (primary scanning) direction of the CCD 201, so that the entire surface of a document is scanned (secondary scanning) and a light beam reflected from a document placed on the document-placing table 101 is formed into an image on the CCD 201, which will be described later, thereby obtaining image data of a document as an electrical signal. The CCD 201 is mounted on a substrate 113; an image processing unit1 which will be described later is mounted on a substrate 114; an I/F unit 115 communicates with external instruments; and an operating unit 182 for operating the apparatus has a display unit (not shown) for displaying the state of the apparatus.

Next, the printer unit 2 will be described. This printer unit 2 is an electrophotographic printer and has four image recording units corresponding to the respective colors Y (yellow), M (magenta), C (cyan), and K (black), and each unit is formed of a photosensitive drum, an image recording head, and so forth. These image recording units are arranged in series along the conveying direction of a recording medium, and a so-called four-drum tandem system is adopted in which a full-colored image is recorded by transferring and overlaying toner images recorded on photosensitive drums for each of the colors Y, M, C, and K onto the same recording medium (recording sheet).

In FIG. 11, a Y image recording unit 120, an M image recording unit 130, a C image recording unit 140, and a K image recording unit 150 record Y, M, C, and K color images, respectively. Since these units are of the same structure, the Y image recording unit 120 will be described as an example below. The Y image recording unit 120 comprises a photosensitive drum 121 as an image carrier, a primary charger 122, a recording head 123 having plural LEDs arranged therein, a developer 124, a sleeve 125 arranged in the developer, and a transfer device 126. In the apparatus, first, the surface of the photosensitive drum 121 is uniformly charged by the primary charger 122. Next, using the recording head 123, exposure is performed for recording each color image according to image data so as to record an electrostatic latent image. In the recording head, 7800 LEDs are arranged in an array arrangement at a density of 600 dpi. Each of the LEDs records a pixel on the opposing photosensitive drum 121 by selectively emitting light according to given image data, as will be described. In addition, the emitting element array is equivalent in size to a shorter side of the A3-size, thereby enabling image recording to be performed on an A3-size sheet. The electrostatic latent image formed in such a manner is developed by the developer 124 to record a Y color toner image. The Y image recording unit 120 has been described; however, other color images are of course recorded in the respective other recording units.

Recording mediums contained in cassettes 161 and 162 in advance are picked up by a pick-up roller 163 or 164 one at a time to be fed on a transfer belt 167 by feed rollers 165 and 166 and attracted thereto by a transfer belt roller 168 and an attraction charger 169. The tip of the recording medium attached to the transfer belt 167 in such a manner is detected by a sheet tip sensor 170. A detection signal is sent to the reader unit 1 to be used for timing control of image data feeding, etc.

Then, the recording medium is conveyed to the left in the drawing at a constant speed, and the Y, M, C, and K color toner images recorded as described above are sequentially overlaid on one another and transferred onto the recording medium by transfer chargers 126, 136, 146, and 156 when passing through the image recording units 120, 130, 140, 150, respectively. The recording medium on which the entire color image forming has been completed by being finally recorded thereon with the K color toner image by the transfer charger 156 in the K image recording unit 150 is separated from the transfer belt 167 after being discharged by a discharger 171. At this time, a frilling charger 172 prevents image disturbance due to frilling discharge. The toner image on the separated recording medium is thermally fixed by a fuser 174 after being charged by a pre-fixing charger 173 so as to supplement toner absorption and then, the recording medium is discharged into a sheet discharge tray 175.

(2. Recording Operation)

Next, the output operation in the printer unit of an image read in the reader unit will be described with reference to FIG. 2.

Figure 2:
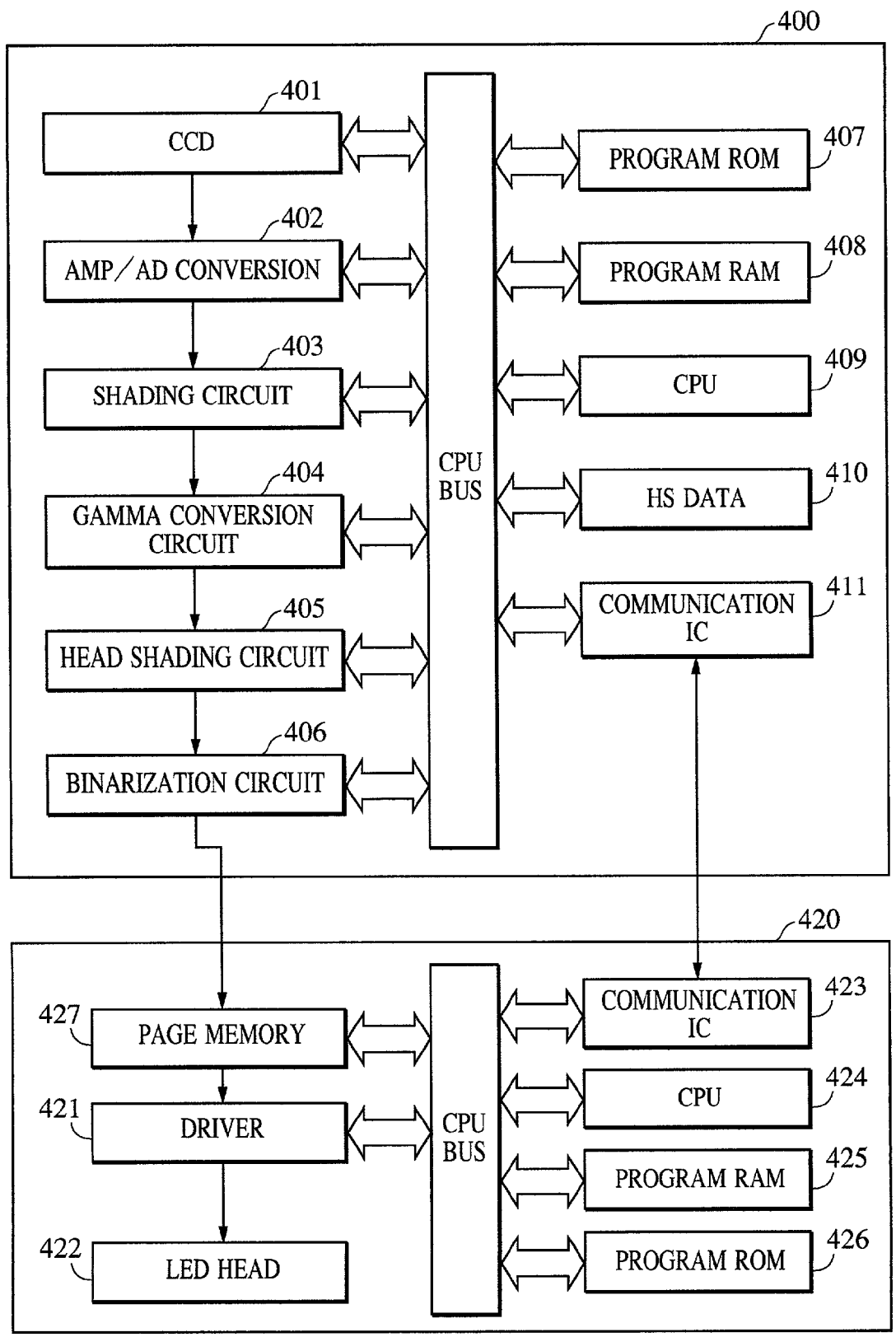
FIG. 2 is a block diagram of the entire structure of an apparatus in which the present invention can be applied.

FIG. 2 is a block diagram of the entire apparatus in the embodiment of the present invention. A reader apparatus 400 in FIG. 2 is equivalent to the reader unit 1 shown in FIG. 11. A line sensor 401 is a CCD image sensor and can read 8000 pixels by arranging reading elements. Also, FIG. 2 shows an AMP/AD conversion circuit 402, a shading circuit 403, a gamma conversion circuit 404, a head shading circuit 405, a binarization circuit 406, a program ROM 407, a program RAM 408, a CPU 409, a head-shading-data memory RAM 410 for memorizing tables 502 and 503 (to be described later 56 , and a communication IC 411. In a printer body 420, FIG. 2 also shows an LED head driver circuit 421, an LED head 422, a communication IC 423, a CPU 424, a program RAM 425, a program ROM 426, and a binary page memory 427. Various driving motors and sensors for controlling the apparatus and an operating panel for operation by users are not shown in FIG. 2.

First, when power supplies of the reader 400 and the printer 420 are turned on, the CPU 409 in the reader reads out correction data for head shading, which is density correction processing for each LED pixel, from the RAM 410 storing the correction data so as to set the data in the head shading gamma table number designating table 502 shown in FIG. 1. The data designates the gamma table number of density correction for each LED pixel and is a density correction value corresponding to the individual LED head. Then, the CPU 409 writes a head shading gamma table in the table 503 by reading it also from the RAM 410. The table data respond to the characteristics of the LED head.

Then, when the operating panel (not shown) instructs start of copying, the reader starts scanning for reading, so that a document on the document placing table is read by the CCD sensor 401. After reading of the document, the output of the CCD is amplified and AD-converted by the circuit 402 so as to output it as 8-bit image data. The output image data is shading-corrected in the shading circuit 403 and is subsequently gamma-corrected in the gamma conversion circuit 404 and thereafter, it is density-corrected by the head shading circuit 405. The density-correction process by the head shading circuit 405 will be described later in detail. The density-corrected image data is binarized by the binarization circuit 406 using a binarization technique such as error diffusion.

The processing by the head shading circuit 405 will be described. FIG. 1 shows the detail of the head shading circuit for density-correction. In FIG. 1, a head shading gamma conversion table is shown, and 6 bits at the high end of the input address are table number determining bits representing table determining numbers while 8 bits at the low end represent image signals. That is, in the table 503, up to 64 tables corresponding to the 6 bits can be accommodated as the head shading gamma table for converting 8-bit image data. In the embodiment, an example in which density correction is performed by using 32 tables will be described. The table 502 converts an LED address into a shading gamma table number (6 bits). That is, the table designates the number of the head shading gamma table to be used for each arranged LED. The table designates to allot each LED pixel address to one table number in the 32 gamma tables. The designating data are processed in the head shading data processing operation which will be described below. The data have been transferred by the CPU 409 from the data memorized in the head shading memory RAM 410 when the power is turned on. A counter 501 is a counter for designating the above-mentioned table. The output of the counter is 13-bit, and the counter 501 counts the primary scanning pixel and designates the LED address. This counter is cleared by a HSYNC signal.

After performing multi-level density-conversion in the head shading circuit 405 in such a manner, the data is binarized through area gradation processing in the binarization circuit 406 so as to output the binarized data from the reader.

The image data output from the reader is input into the printer 420 so as to write the data into the binary page memory 427. The data is read from the page memory 427 in the written order so as to feed the data to the LED head 422. In such a manner, an image is recorded on a sheet of recording medium based on the data in which nonuniformities in density of the printing head are corrected.

(3. Procedure of Processing Correction Data)_

Next, the processing of the correction data used for head shading will be described with reference to the drawings.

As described above, FIG. 1 is a block diagram of a circuit for correcting nonuniformities in density (head shading). FIG. 1 shows the circuit 503 for converting multi-level image data corresponding to a table number, the table 502 for designating the table number, the counter 501 for designating the table, which is counted up simultaneously with an image clock signal VCK and cleared by the synchronizing signal HSYNC synchronous with the primary scanning, a register or bus 505 set by the CPU, and a sampling circuit 504 for storing the data into a sampling memory as a secondary scanning pixel, in which a predetermined number of pixels is averaged in the primary scanning direction.

The correction circuit for nonuniformities in density shown in FIG. 1 corresponds to one predetermined color to be recorded in the recording apparatus, so that the apparatus is provided with a circuit similar to that shown in FIG. 1 for each of the respective colors to be recorded. Accordingly, the recording apparatus shown in FIG. 11 is provided with four circuits similar to that shown in FIG. 1 corresponding to the respective colors yellow (Y), magenta (M), cyan (C), and black (K).

Figure 3:
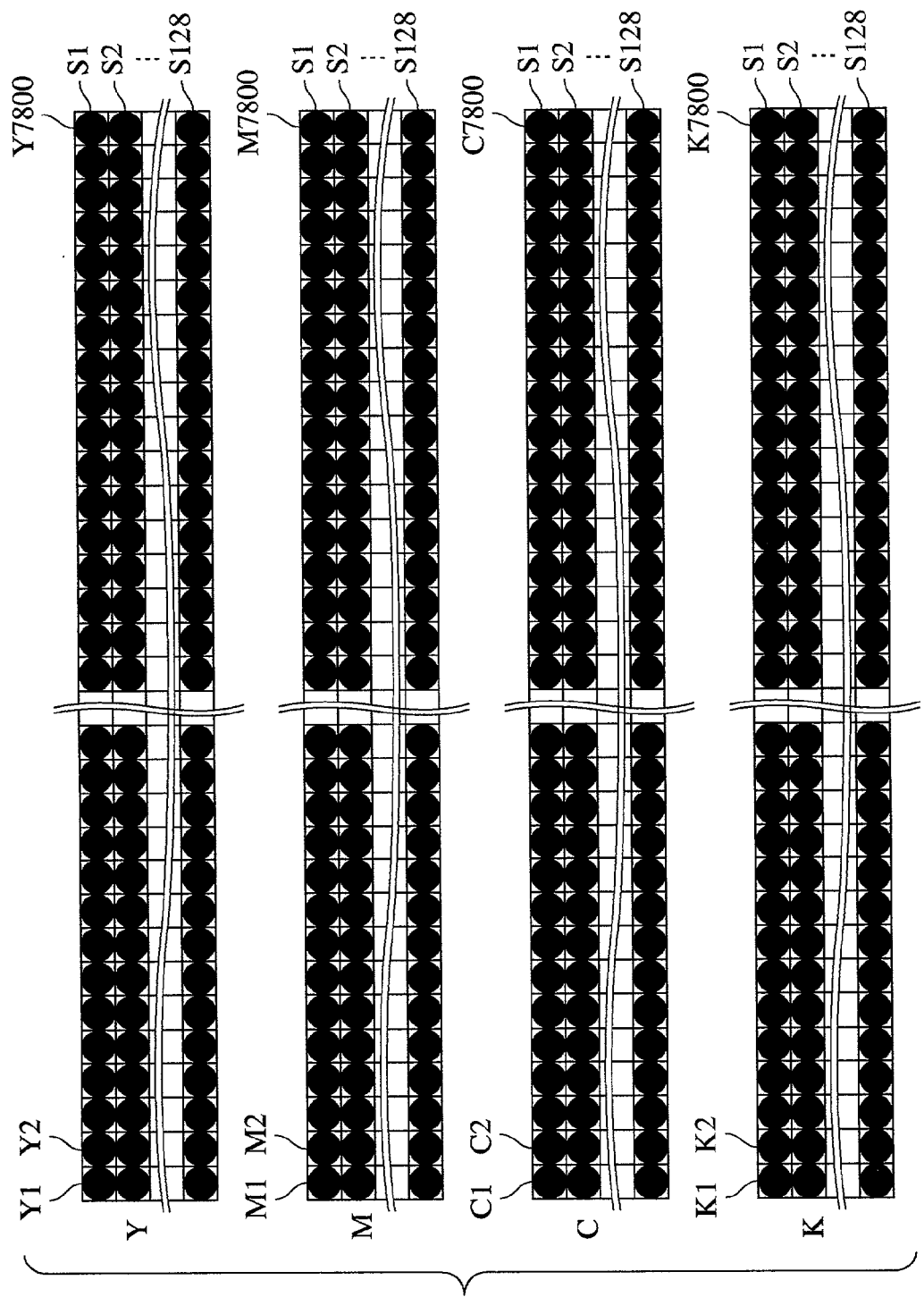
FIG. 3 is a drawing showing test pattern examples for preparing correction data of nonuniformities in density.

FIG. 3 is a drawing showing test pattern examples for preparing the density correction table, in which a black circular spot shown in the drawing designates the position of a recorded pixel. The patterns shown in FIG. 3 are the pattern examples recorded by the recording heads 123, 133, 143, and 153 corresponding to the respective colors Y, M, C, and K, and 128 pixels are recorded by recording elements arranged in the each recording head. That is, it is a pattern in which 128 pixels are recorded along the direction of conveying a recording medium to have the width of a pixel corresponding to the number of recording elements (7800) arranged in the recording head. In FIG. 3, when the pattern recorded for the yellow recording head is described as an example, for the LEDs which are recording elements arranged in the recording head, Y1 denotes the pixel recorded by the LED located at one end; Y2 denotes the pixel recorded by the second LED; and Y7800 represents the pixel recorded by the LED located at the other end. The pattern Y in FIG. 3 shows positions of the recorded pixels when 128 pixel rows from S1 to S128, each pixel row consisting of pixels from Y1 to Y7800, are recorded by moving a recording medium along the secondary scanning direction (conveying direction). Other colors are recorded in a similar manner, so a description thereof is omitted.

Next, the procedure for preparing the correction data will be sequentially described.

First, the test pattern shown in FIG. 3 is printed. This test pattern is the binarized 8-bit multi-level data 80H corresponding to 256 gradation levels from 0 to 255 (from 00H to FFH). The pattern is recorded along the overall width in the arranging direction of LEDs in the recording head (hereinafter referred to as the primary scanning direction). That is, by using all the recording elements of the LED head in each single color of the colors yellow, magenta, cyan, and black, the pattern is recorded to have a predetermined width (equivalent to 128 pixels in the embodiment) in the secondary scanning direction which is the conveying direction of a recording medium. The multi-level data 80H are area-gradation-processed by binarization, so that the recorded result is printed with probability that one dot per two dots is printed in each pixel position shown in FIG. 3. Therefore, when the density of the test pattern is read, the density is determined by reading pixels within one region by averaging them.

Next, the processing by a CCD line sensor of the reader unit for reading of the recorded test pattern will be specifically described.

Figure 4:
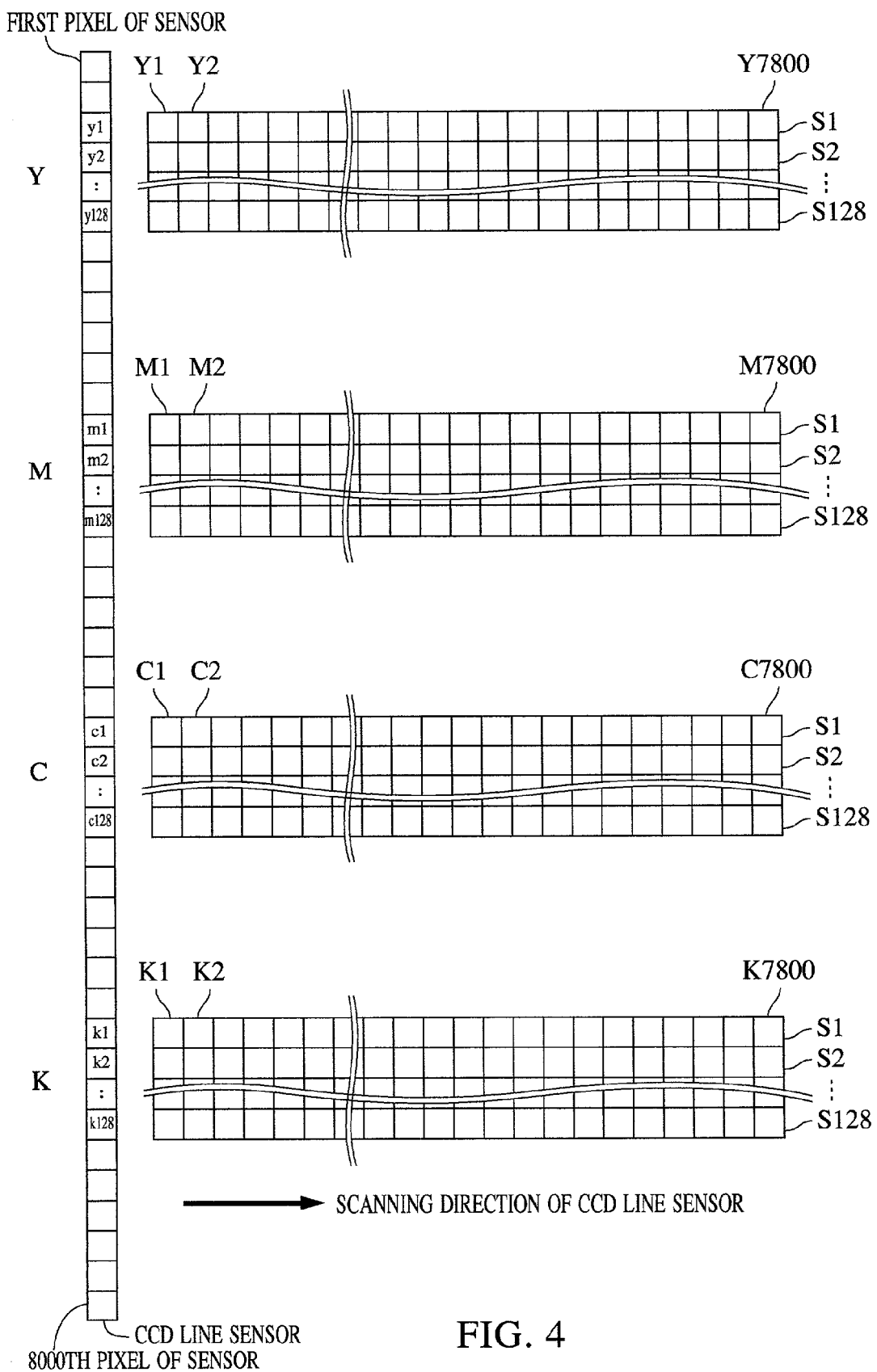
FIG. 4 is a schematic representation showing a reading technique of the pattern shown in FIG. 3.

FIG. 4 shows a reading technique of the pattern shown in FIG. 3 by the CCD line sensor of the reader unit.

As shown in FIG. 4, the pattern is scanned (secondary scanning) by the CCD line sensor in the arrangement direction of the pixels recorded by each LED of the recording head, so that the pattern is read. By this reading by the CCD line sensor, the equivalents for 128 pixels of the pattern are averaged at every one pixel in the secondary scanning so as to be written into the sampling memory. The reason of averaging 128 pixels is that the area-gradation-processed pixel is to be accurately read. The sampling memory has a capacity for memorizing the pixel average values of 8000 pixels, and is built in the sampling circuit 504 shown in FIG. 1.

The data memorized in the memory by the secondary scanning for each color are written into 8000 addresses in the sampling memory. In such a manner, the printing region equivalent to 7800 pixels are written into certain addresses while the white image data which are blank spaces are written into the remaining addresses. With respect to this data, the data region showing a density of 50 or more is determined to be the printing region of the test pattern. In this embodiment, addresses from 101 to 7899 of the sampling memory are determined to be the printing region. That is, the data equivalent to 7799 pixels is read. Since the number of the printed pixels is 7800 pixels, it decreases by one pixel during the printing. The reason for this seems to be that the sheet shrinks during passing through heating rollers after toner is transferred thereon in the electrophotographic system, or there are inaccuracies in the arrangement of the LED head for forming a latent image on the photosensitive drum, etc. In any case, since the correction table cannot be prepared for LEDs equivalent to 7800 pixels based on the data equivalent to 7799 pixels, the secondary scanning is performed at a different scanning speed so as to prepare the correction data by obtaining the data equivalent to 7800 pixels. The ratio of the secondary scanning speed of the CCD line sensor at this time relative to the first secondary scanning speed is 7799/7800 (99.99%). Also, a periodic time of reading by the CCD line sensor may be changed instead of changing the scanning speed of the CCD line sensor, or both the scanning speed of the CCD line sensor and the period of the reading may be changed.

Based on the data corresponding to the respective 7800 pixels prepared in such a manner, the correction tables corresponding to 7800 LED elements are prepared.

Figure 5A:
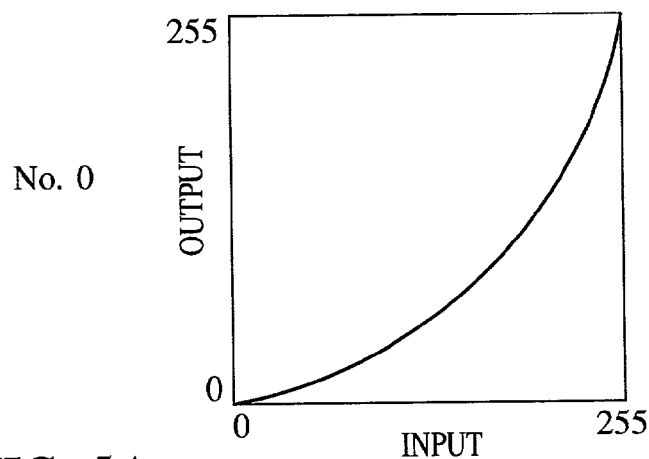
FIGS. 5A to 5C are drawings showing situations of correction tables for correcting nonuniformities in density.
Figure 5B:
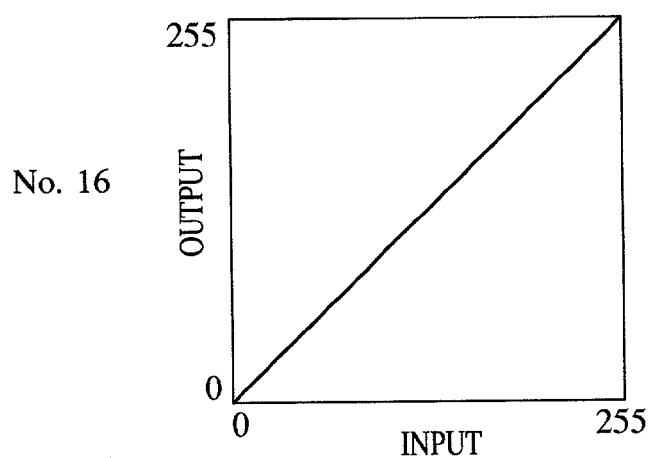
Figure 5C:
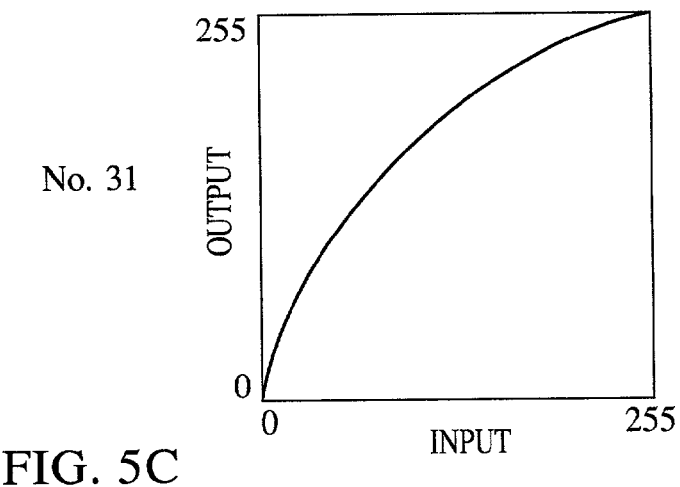

When preparing HS tables, the processing for making the density of a pixel to correspond to each LED element is performed. At this time, for a pixel with lower density, the head shading gamma table number increasing the density is designated while for a pixel with conversely higher density, the head shading gamma table number decreasing the density is designated. In the gamma tables, 32 kinds of standard correction table groups (from No. 0 to No. 31) are prepared. Examples of these groups are shown in FIGS. 5A to 5C. These drawings representatively show three kinds of tables of the 32 kinds. FIGS. 5A, 5B, and 5C represent the table Nos. 0, 16, and 31, respectively.

In the tables shown in FIGS. 5A to 5C, No. 0 is a table to be designated for the printing element for printing with highest density, which makes the printing element reduce its printing density, and No. 31 is a table to be designated for the printing element for printing with lowest density, which makes the printing element increase its printing density. No. 16 is a table to be designated for the printing element for neutrally printing and the conversion of the density value is not performed in this table.

The tables not shown in the drawings are correction tables for correcting the values corresponding to intermediate values of table Nos. 0, 16, and 31.

In addition, the above-mentioned tables shown in FIGS. 5A to 5C are tables reducing the density over the entire density level range (FIG. 5A) or are tables increasing the density over the entire density level range (FIG. 5C) excluding the table No. 16.

Figure 7:
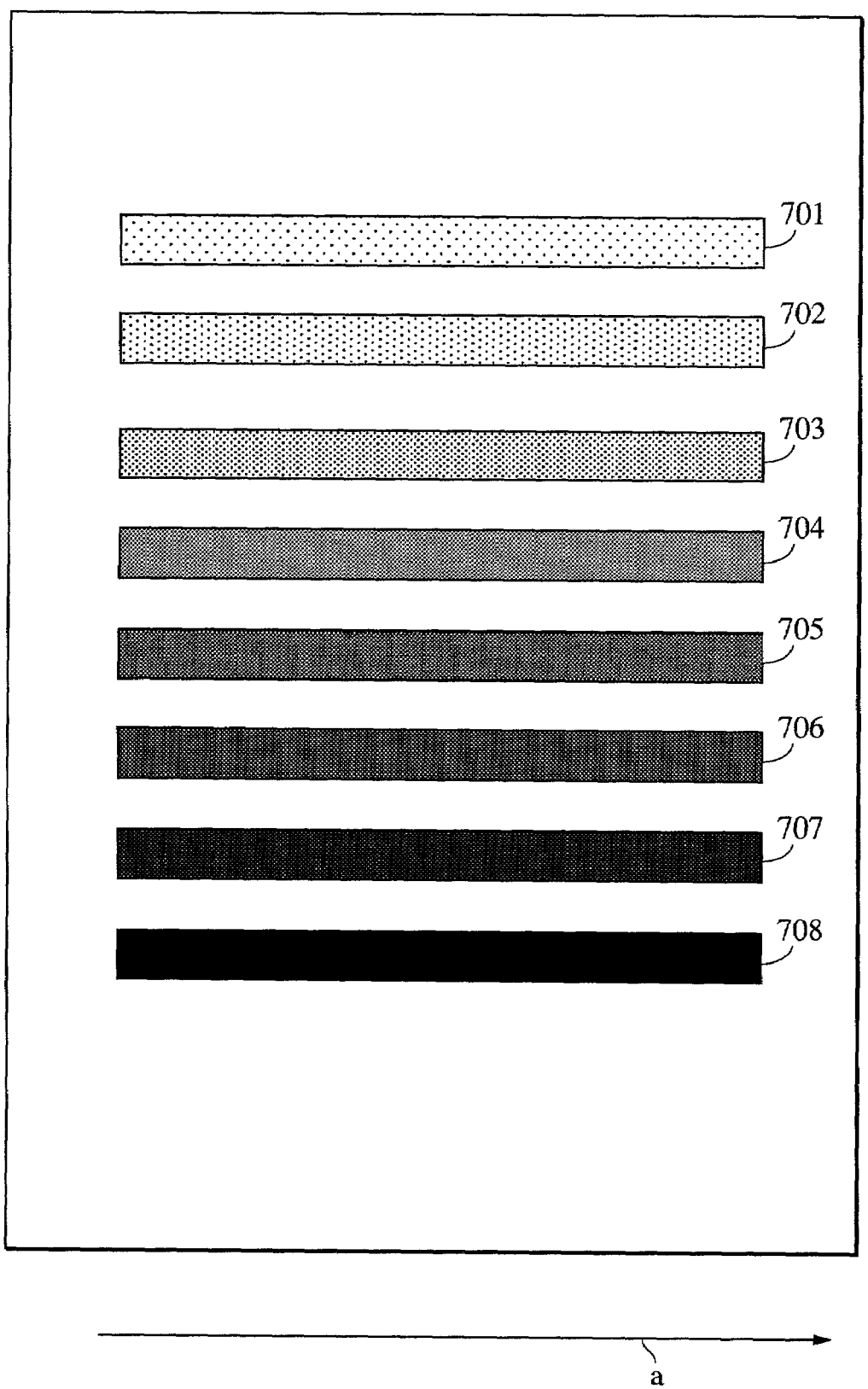
FIG. 7 is a drawing showing a test pattern example for confirming nonuniformities in density.

Next, the standard correction is performed by using the head shading tables prepared before so as to print a pattern (referred to as a pattern 7a) shown in FIG. 7. In FIG. 7, arrow a indicates the primary scanning direction, i.e., the direction of arrangement of LEDs functioning as recording elements of the recording head. In FIG. 7, the patterns 701 to 708 are recorded respectively corresponding to multi-level data with densities different from each other. In the embodiment, the pattern 701 is recorded according to the multi-level data corresponding to the density 20H, and the patterns 702 to 708 are recorded according to the multi-level data corresponding to the densities 40H, 60H, 80H, AOH, COH, EOH, and FFH, respectively.

The density pattern 704 for 80H in the pattern 7a is identical in density to the test pattern recorded for preparing the head shading table before. Since the pattern 7a is corrected and recorded based on the head shading table, nonuniformities in density of the pattern 704 corresponding to the density value 80H are thoroughly corrected.

When searching for a pattern having nonuniformities in density from the patterns 701 to 708 of the patterns 7a, in the case that nonuniformities in density are not recognized, the nonuniformities in density in each density level are solved by the head shading data prepared before, so that the preparing operation of the head shading data is finished. However, when nonuniformities in density are recognized in the pattern 701 corresponding to the density 20H, for example, it is understood that nonuniformities in density in the lower density level are not thoroughly solved. The correction state at this time is either excessive or insufficient; in order to confirm the state, this is determined by recording the pattern shown in FIG. 7 without head shading correction.

Figure 9:
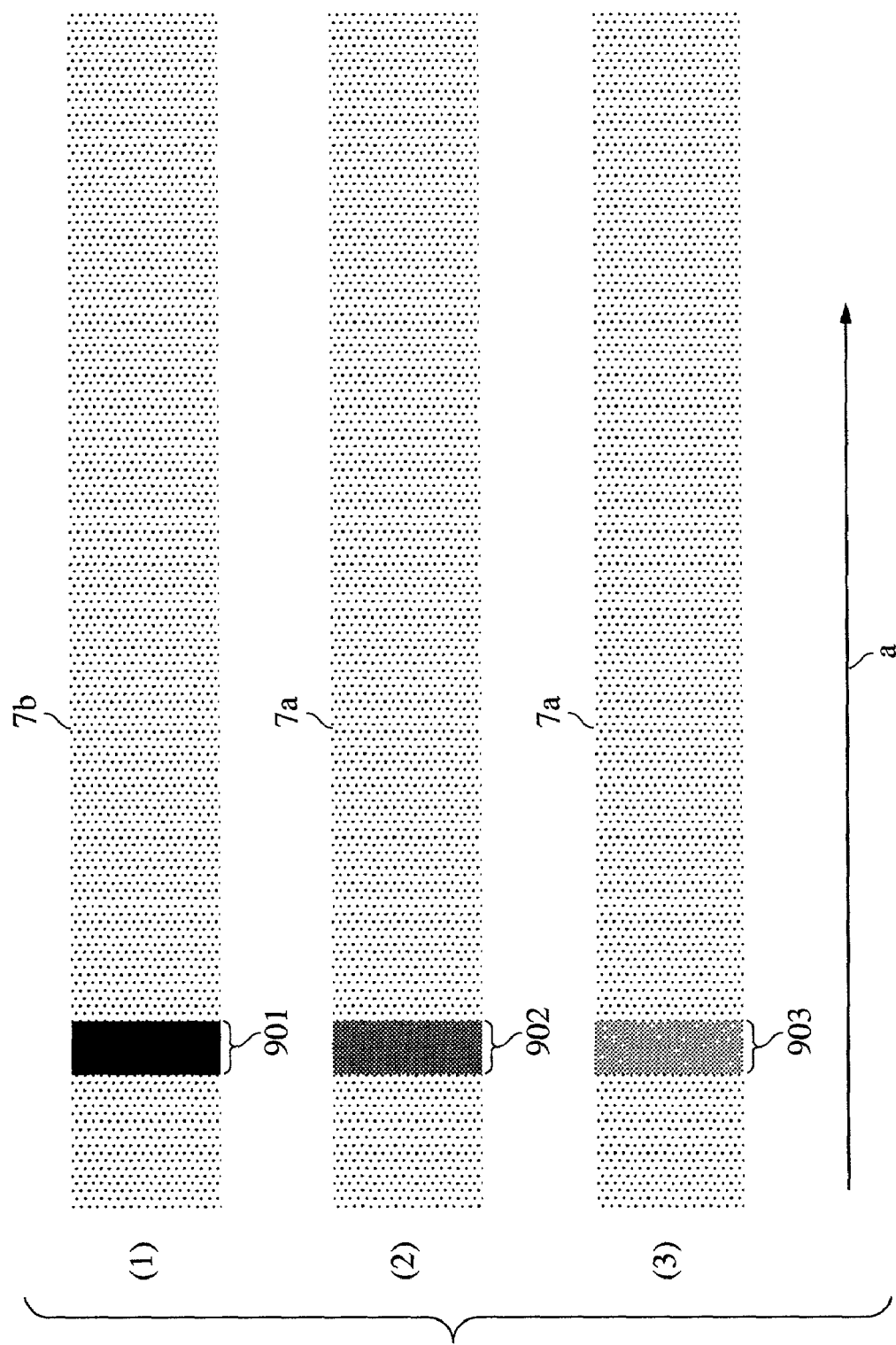
FIG. 9 is a schematic representation showing correcting situations.
Figure 10:
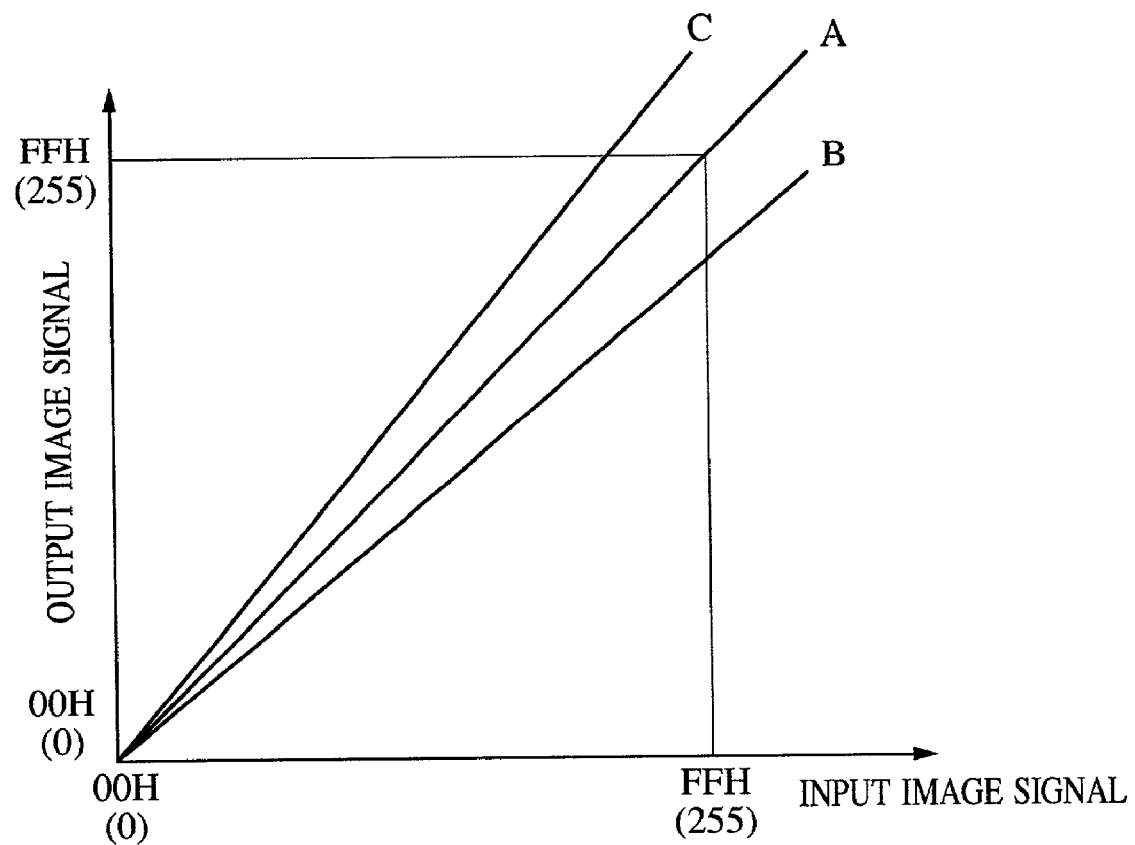
FIG. 10 is a drawing showing a situation of a conventional correction table for correcting nonuniformities in density.

In FIG. 9, (1) shows an example of a pattern (hereinafter referred to as a pattern 7b) recorded without correction. In FIG. 9, just like in FIG. 7, arrow a indicates the primary scanning direction, i.e., the direction of arrangement of LEDs functioning as recording elements of the recording head. In pattern (1) of FIG. 9, numeral 901 denotes a portion in which nonuniformities in density are recognized. In patterns (2) and (3) of FIG. 9, which are recorded examples corrected by head shading, numerals 902 and 903 denote portions in which nonuniformities in density are recognized.

When comparing the portion with high density (901) of the pattern 7b recorded without correction to the above-described pattern 7a recorded with correction by head shading, in the case that the high density is still recognized as shown in the numeral 902 of pattern (2) of FIG. 9, even though the density is reduced lower than that before the correction (indicated by the numeral 901 of pattern (1) of FIG. 9), and insufficient density correction is determined. In contrast, when the pattern 7a after correction is in a lower density state as shown by the numeral 903 of pattern (3) of FIG. 9, i.e., when the density is reduced, excessive density correction by head shading is determined.

In the patterns 704 to 708 recorded by multi-level data with the density 80H or more among the patterns shown in FIG. 7, when nonuniformities in density are not recognized, the correction by head shading is effectively performed so that nonuniformities in density are corrected.

Figure 6A:
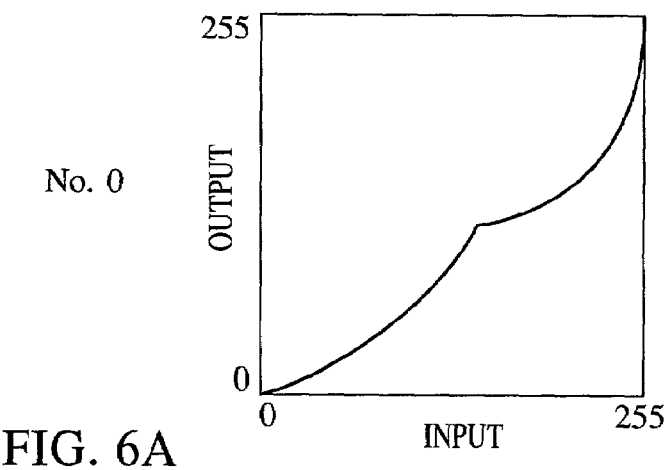
FIGS. 6A to 6C are drawings showing situations of correction tables for correcting nonuniformities in density.
Figure 6B:
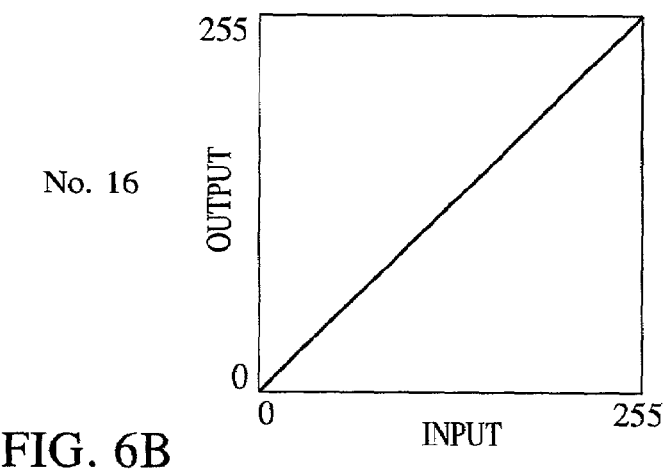
Figure 6C:
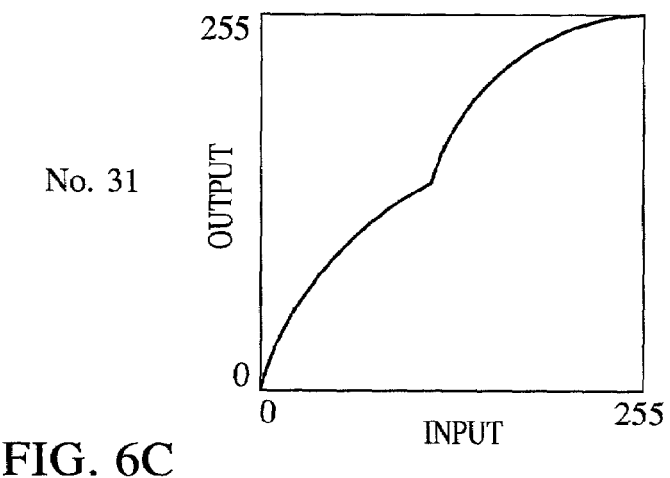

In the examples described above, when it is understood that excessive correction is produced in the lower density levels while the correction is properly performed in the higher density levels, a table group having a reduced amount of correction in the lower density levels as compared to that in the higher density levels is designated to be used. FIGS. 6A to 6C show examples of these tables. In FIGS. 6A to 6C, three kinds of tables are representatively shown just like those in FIGS. 5A to 5C. The tables shown in FIGS. 6A to 6C denote table Nos. 0, 16, and 31, respectively.

Figure 8A:
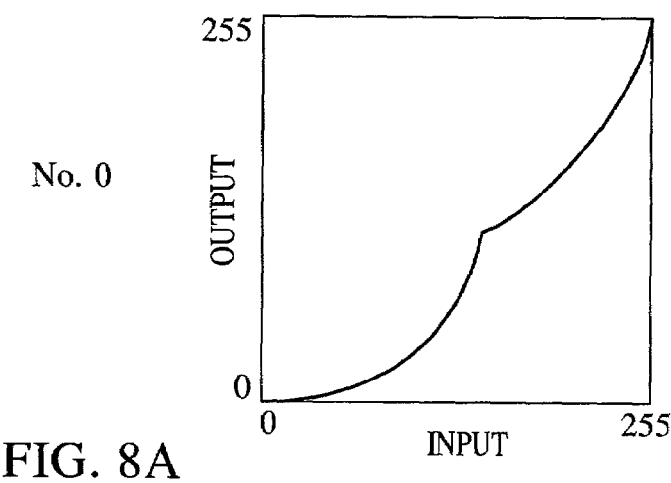
FIGS. 8A to 8C are drawings showing situations of correction tables for correcting nonuniformities in density.
Figure 8B:
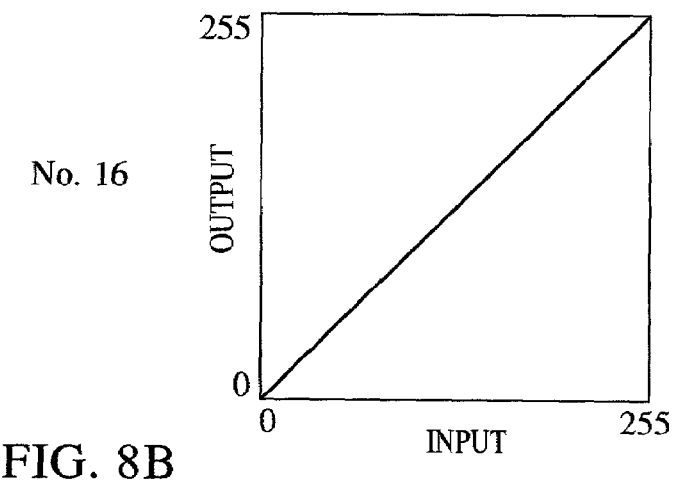
Figure 8C:
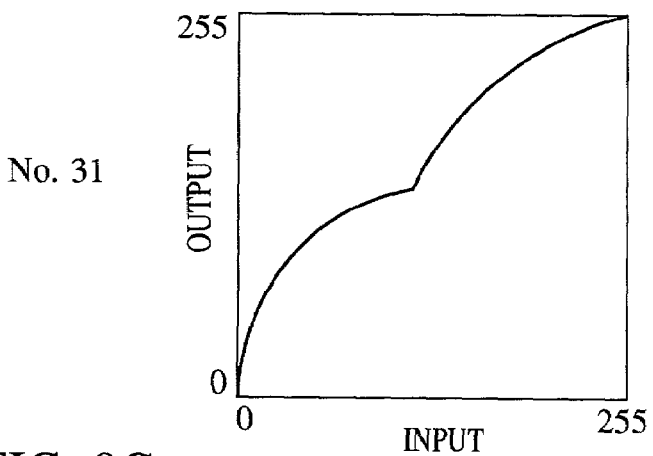

Also, when nonuniformities are properly corrected in the lower density levels while excessive correction is produced in the higher density levels, as shown in the drawings, a table group (FIGS. 8A, 8B, and 8C) having a reduced amount of correction in the higher density levels as compared to that in the smaller density levels is designated to be used. As for the table group shown in FIGS. 8A to 8C, three kinds of tables are representatively shown just like those in FIGS. 5A to 5C and FIGS. 6A to 6C.

As described above, three kinds of correction table groups as shown in FIGS. 5A to 5C, FIGS. 6A to 6C, and FIGS. 8A to 8C, are prepared, which are the standard correction table group, the table group having a different correction amount in the lower density levels, and the table group having a different correction amount in the higher density level, so that an image properly corrected over the entire density level range can be obtained by selecting the optimum correction table by a user based on the result taken from the pattern 7a recorded with the standard correction and the pattern 7b recorded without correction.

The data prepared in such a manner is memorized into the RAM 410 as the head shading gamma table number designating table. The head shading table once prepared can be reused by using a battery for data backup.

In the embodiment described above, the combination of the standard correction amount and the small correction amount in the respective low density and high density levels is described; however, a number of combinations may be considered, such as dividing the density level and combinations of tables with high magnitude of correction (larger amount of correction) and tables with low magnitude of correction (smaller amount of correction). By preparing various correction table groups in consideration of various characteristics of recording elements in the recording head, nonuniformities in density can be more properly corrected.

In practical use, it is not necessary to prepare all the considered various table groups; only the combination of table groups possibly needed for a particular recording apparatus need be selectively prepared along the various table groups in consideration of the capacity of a storage device such as a memory attached to the apparatus. Also, a necessary table group may be prepared in consideration of the trend of characteristics obtained experimentally. For example, for the apparatus or the recording head in which excessive correction is performed at only the low density levels, if only two kinds of table groups are prepared, namely, the standard table and the table with the reduced amount of correction at the low density levels, satisfactory correction can be effectively achieved.

With respect to the procedure for determining whether the correction is excessive or insufficient based on the pattern 7b shown in FIG. 9, it may also be automatically performed by comparing the density determined by using the reader unit to the result which is read from FIGS. 3 and 7, etc. In this case, the read result for each pattern is stored in a storage device such as a memory and the density difference of each pattern is obtained by computation corresponding to each recording element, so that it can be determined whether the correction is excessive or insufficient, enabling the correction table group to be automatically selected according to the result.

In addition, the embodiment has been described using an electrophotographic LED printer as an example, which has a recording head having LED elements arranged for recording therein; however, the present invention is not limited to the LED printer mentioned above, and it may be applied to a so-called ink-jet type recording apparatus, for example, in which plural nozzles are arranged so that ink is ejected from the nozzle so as to perform recording. Among the ink-jet system, there are known systems using piezoelectric elements as elements generating energy for ejecting ink, and other systems using electrothermal converters such as heaters so that bubbles are produced in ink by the thermal energy so as to eject the ink, and any of these systems can be applied to the present invention.

The embodiment has also been described using a copying machine as an example of a recording apparatus, which has a reader unit for reading a document image; however, the present invention is not limited to an apparatus having reader and printing units which are formed in one body, and it may be applied to an apparatus having reader and printing units which are individually formed as separated bodies. Also, a printer having a recording function may be applied thereto, in which a host device such as a personal computer receives image data for recording. In such a printer, it may be constructed with the test pattern recorded by the printer being read by using a general scanner device connected to the host computer, etc., so that the data for correcting nonuniformities in density can be prepared according to the read result.

The individual components shown in outline or designated by blocks in the drawings are all well-known in the recording and image processing arts and their specific construction and operation are not critical to the operation or the best mode for carrying out the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus for recording an image on a recording medium by using a recording head in which a plurality of recording elements are arranged and for correcting non-uniformities in the density of the recorded image caused by different recording elements having different recording characteristics, said apparatus comprising:

memory means for storing a first table group for correcting input multi-level image data, the first table group comprising a plurality of first correction tables, each first correction table having a different degree of correction, and a second table group comprising a plurality of second correction tables having correction characteristics which are different from correction characteristics of the first table group with respect to different density levels;

first forming means for instructing each of the recording elements to record a pixel of a predetermined density to form a first test pattern using all of the recording elements;

first setting means for setting test correction tables for making the densities of an image to be recorded by the plurality of recording elements uniform by associating first correction tables of the first table group with respective recording elements of the plurality of recording elements based on a result of reading the densities of areas of the first test pattern that correspond to the plurality of recording elements;

second forming means for instructing each of the plurality of recording elements to record a plurality of pixels at the same plurality of different density levels, to form a second test pattern having a plurality of different density levels, the second test pattern being recorded with the recording elements being corrected by the test correction tables set by said first setting means; and second setting means for setting recording correction tables corresponding to each of the plurality of recording elements based on the second test pattern, the recording correction tables being selected from among the first table group and the second table group.

2. An apparatus according to claim 1, further comprising selection means for selecting the recording correction tables by a user judging the second test pattern.

3. An apparatus according to claim 1, wherein the second table group comprising the plurality of second correction tables comprises a first table for higher density levels and a second table for lower density levels, the second table having a degree of correction different from a degree of correction of the first table.

4. An apparatus according to claim 1, wherein the recording elements comprise light emitting elements.

5. An apparatus according to claim 4, wherein the light emitting elements comprise LED elements.

6. An apparatus according to claim 1, wherein the recording head is an ink jet head for recording by ejecting ink from a plurality of nozzles in response to driving of the recording elements.

7. An apparatus according to claim 6, wherein the recording elements comprise electrothermal converters for applying thermal energy to ink.

8. An apparatus according to claim 6, wherein the recording elements comprise piezoelectric converters for ejecting the ink.

9. An apparatus according to claim 1, further comprising reading means for reading recorded images.

10. An apparatus according to claim 9, wherein said first setting means sets the test correction tables based on a result of reading the first test pattern by said reading means.

11. An apparatus according to claim 1, further comprising third forming means for forming a third test pattern having the plurality of different density levels, the third test pattern being recorded by recording elements uncorrected by any correction table, wherein said second setting means sets the recording correction tables based on a comparison of the second test pattern and the third test pattern.

12. An apparatus according to claim 11, wherein the comparison of the second and third test patterns is performed by a user.

13. An apparatus according to claim 11, further comprising reading means for reading recorded images and comparing means for comparing densities of read images, wherein said reading means reads the second and third test patterns and the comparison of the second and third test patterns is performed by said comparing means comparing data read by said reading means.

14. A method for correcting non-uniformities in the density of an image recorded by a recording head having a plurality of recording elements arranged therein caused by different recording elements having different recording characteristics, said method comprising the steps of:

forming a first test pattern by instructing each of the recording elements to record a pixel of a predetermined density;

setting, in a first setting step, test correction tables for making the densities of an image to be recorded by the plurality of recording elements uniform by associating first correction tables, which are from among a first table group for correcting input multi-level image data, with respective recording elements of the plurality of recording elements based on a result of reading densities of areas of the first test pattern that correspond to the plurality of recording elements;

forming a second test pattern having a plurality of different density levels by instructing each of the plurality of recording elements to record a plurality of pixels at the same plurality of different density levels, the second test pattern being recorded with the recording elements being corrected by the test correction tables set in said first setting step; and setting, in a second setting step, recording correction tables corresponding to each of the plurality of recording elements based on the second test pattern, the recording correction tables being selected from among the first table group and a second table group comprising second correction tables having correction characteristics which are different from correction characteristics of corresponding first correction tables of the first table group with respect to different density levels.

15. A method according to claim 14, further comprising a step of selecting the recording correction tables by a user judging the second test pattern.

16. A method according to claim 14, wherein the second table group comprising the plurality of second correction tables comprises a first table for higher density levels and a second table for lower density levels, the second table having a degree of correction different from a degree of correction of the first table.

17. A method according to claim 14, further comprising a step of reading recorded images, wherein said first setting step sets the test correction tables based on a result of reading the first test pattern in said reading step.

18. A method according to claim 14, further comprising a third forming step of forming a third test pattern having the plurality of different density levels, the third test pattern being recorded by recording elements uncorrected by any correction table, wherein said second setting step sets the recording correction tables based on a comparison of the second test pattern and the third test pattern.

19. A method according to claim 18, wherein the comparison of the second and third test patterns is performed by a user.

20. A method according to claim 18, further comprising a step of reading recorded images and a step of comparing densities of read images, wherein said reading step reads the second and third test patterns and the comparison of the second and third test patterns is performed by said comparing step comparing data read in said reading step.

21. A recording apparatus for performing binary recording on a recording medium by controlling binarizing means for binarizing input multi-level data and driving recording heads, each recording head comprising a plurality of recording elements, according to a binary signal output by the binarizing means, and for correcting non-uniformities in the density of a recorded image caused by different recording elements having different recording characteristics, said apparatus comprising:

a plurality of density correcting table groups for correcting input multi-level image data, the density correcting table groups each comprising a plurality of correcting tables, each having a different correction amount and having different correction characteristics from each other, wherein corresponding tables from each table group differ in correction amount at a particular density level range;

means for determining whether different recording elements have different recording characteristics by determining whether all of the recording elements record pixels of a predetermined density level in response to being instructed by the multi-level data to record at the predetermined density level;

means for selecting, for any recording element determined by said determining means not to print a pixel at the predetermined density, a density correcting table group from the plurality of density correcting table groups having a correcting table correcting the density of pixels to be recorded by that recording element; and correcting means for correcting the operation of any recording element determined by said determining means not to print a pixel at the predetermined density by associating the address of that recording element with the correcting table from the selected correcting table group that will correct the density of pixels recorded by that recording element.

22. An apparatus according to claim 21, wherein in said means for selecting the one density correcting table group from the plurality of density correcting table groups, selection input is performed by a user.

23. An apparatus according to claim 21, wherein one correcting table group of the plurality of correcting table groups comprises correcting tables having correction characteristics which differ from correction characteristics of correcting tables of another correcting table group at different density levels.

24. An apparatus according to claim 21, further comprising means for generating the multi-level data by reading a document.

25. An apparatus according to claim 21, wherein the recording elements comprise light emitting elements.

26. An apparatus according to claim 25, wherein the light emitting elements comprise LED elements.

27. An apparatus according to claim 21, wherein the recording head is an ink jet head for recording by ejecting ink from a plurality of nozzles in response to driving of the recording elements.

28. An apparatus according to claim 27, wherein the recording elements comprise electrothermal converters for applying thermal energy to ink.

29. An apparatus according to claim 27, wherein the recording elements comprise piezoelectric converters for ejecting the ink.

30. A recording apparatus according to claim 1, wherein said first setting means comprises:

means for reading the density of each recorded pixel produced by each recording element;

means for determining whether the read density of each recorded pixel is the same as the predetermined density; and means for correcting the operation of each recording element that recorded a pixel of different density than the predetermined density by associating a particular first correction table of the first table group with each recording element that recorded a pixel of a different density than the predetermined density, the particular first correction table associated with each recording element providing a compensating correction to each recording element that recorded a pixel of a different density than the predetermined density, wherein correction tables associated with recording elements recording pixels of different densities by the first forming means provide differing compensating corrections.

31. A recording apparatus according to claim 30, wherein said second setting means comprises:

means for reading the density of each recorded pixel produced by each recording element as a result of being instructed to record by said second forming means;

means for determining whether the recorded pixels exhibit a non-uniform density within each density level; and means for correcting the operation of each recording element at a particular instructed density level that contributes to any determined density non-uniformity by associating a particular first correction table of the first table group or a particular second correction table of the second table group with each recording element that contributes to any determined density non-uniformity.

32. A method according to claim 14, wherein said first setting step comprises the steps of:

reading the density of each recorded pixel produced by each recording element;

determining whether the read density of each recorded pixel is the same as the predetermined density; and correcting the operation of each recording element that recorded a pixel of different density than the predetermined density by associating a particular first correction table of the first table group with each recording element that recorded a pixel of a different density than the predetermined density, the particular first correction table associated with each recording element providing a compensating correction to each recording element that recorded a pixel of a different density than the predetermined density, wherein correction tables associated with recording elements recording pixels of different densities by the first forming means provide differing compensating corrections.

33. A method according to claim 32, wherein said second setting step comprises the steps of:

reading the density of each recorded pixel produced by each recording element instructed by said second forming step;

determining whether each of the read pixels recorded as a result of instructions provided in said second forming step produce a non-uniform density within each density level; and correcting the operation of each recording element at a particular instructed density level that produces a density non-uniformity by associating a particular first correction table of the first table group or a particular second correction table of the second table group with each recording element that contributes to any determined density non-uniformity.

34. A recording apparatus according to claim 21, wherein said determining means comprises:

means for reading the density of each recorded pixel produced by each recording element; and means for determining whether the read density of each recorded pixel is the same as the predetermined density level.

* * * * *